United States Patent
Stark et al.

(10) Patent No.: US 7,159,905 B1
(45) Date of Patent: Jan. 9, 2007

(54) MATERIAL FEED HOSE SYSTEM AND METHOD OF CONSTRUCTING A MATERIAL FEED HOSE SYSTEM

(76) Inventors: Patricia A. Stark, 12567 SW. Pembrooke Cir. North, Lake Suzy, FL (US) 34269; Jon Zook, 8101 Country Rd. #104, Ft. Myers, FL (US) 33919

(*) Notice: Subject to any disclaimer, the term of this patent is extended or adjusted under 35 U.S.C. 154(b) by 108 days.

(21) Appl. No.: 10/724,674

(22) Filed: Dec. 1, 2003

Related U.S. Application Data

(60) Division of application No. 10/724,672, filed on Dec. 1, 2003, which is a continuation-in-part of application No. 10/378,183, filed on Mar. 3, 2003, now Pat. No. 6,823,653.

(51) Int. Cl.
*F16L 53/00* (2006.01)

(52) U.S. Cl. .................. 285/41; 285/245; 285/222.4; 138/33

(58) Field of Classification Search ............... 285/21.2, 285/241, 245, 256, 222.1–222.5, 41, 257; 138/32, 33, 149
See application file for complete search history.

(56) References Cited

U.S. PATENT DOCUMENTS

| 1,913,030 | A | * | 6/1933 | Hux ........................... 285/246 |
| 2,076,632 | A | * | 4/1937 | Goodall ........................ 285/55 |
| 4,455,474 | A | * | 6/1984 | Jameson et al. ............ 392/472 |
| 4,486,035 | A | * | 12/1984 | Storke ......................... 285/253 |
| 4,553,023 | A | * | 11/1985 | Jameson et al. ............ 392/472 |
| 4,667,084 | A | * | 5/1987 | Regge .......................... 392/495 |
| 5,306,051 | A | * | 4/1994 | Loker et al. .............. 285/222.1 |
| 5,860,682 | A | * | 1/1999 | Belcher ................... 285/222.1 |

\* cited by examiner

*Primary Examiner*—David Bochna
(74) *Attorney, Agent, or Firm*—Edward P. Dutkiewicz

(57) ABSTRACT

A material feed hose has a multilayered hose with an inflow end, an intermediate length, and an outflow end. The hose has an an armored crush-resistant outer layer and a heating layer disposed between an inner layer and an intermediate insulating layer. A pair of hollow tubular fittings have a beveled inflow to limit the amount of material which is out of the flow path as the material moves through the hose. The fittings have an associated pair of hose clamps.

1 Claim, 4 Drawing Sheets

| BILL OF MATERIALS | |
|---|---|
| ITEM | DESCRIPTION |
| A | ONE PIECE SPECIAL STAINLESS STEEL FITTING |
| B | BRASS COMPRESSION SLEEVE |
| C | HOSE COLLAR PART A |
| D | HOSE COLLAR PART B |
| E | HOSE COLLAR PART C |
| F | PROTECTIVE CORD COVER |
| G | CLEAR PVC VACUUM TUBING |
| H. | BLACK POLYESTER TAPE |
| I | THERMAL INSULATION |
| J | KAPTON TAPE |
| K | HEATER WIRE |
| L | STAINLESS STEEL BRAIDED TEFLON HOSE |
| M | SEALANT |

MATERIAL FEED HOSE SYSTEM AND METHOD OF CONSTRUCTING A MATERIAL FEED HOSE SYSTEM

RELATED APPLICATION

This application is a division of a patent application filed concurrently on Dec. 1, 2003 entitled Pressurized Sanitary Precision Polymer Film Casting and Dispersion Injection System and Method of Constructing a Pressurized Sanitary Precision Polymer Film Casting and Dispersion Injection System, Ser. No. 10/724,672 which is a Continuation-in-Part Application of application Ser. No. 10/378,183, filed on Mar. 3, 2003, issued Nov. 30, 2004, as U.S. Pat. No. 6,823,653.

BACKGROUND OF THE INVENTION

1. Field of the Invention

The present invention relates to a material feed hose system and more particularly pertains to for allowing a user to move material from one location to another location while keeping the material heated and isolated.

2. Description of the Prior Art

The use of other methods and apparatuses for transporting material is known in the prior art. More specifically, other methods and apparatuses for transporting material previously devised and utilized for the purpose of moving fluid material are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 6,190,480 issued to Carlson on Feb. 20, 2001 discloses a method of making a double walled, heated hose. U.S. Pat. No. 5,637,168 issued on Jun. 10, 1997 to Carlson discloses a Flexible tubing ans support bead on a heated hose. Lastly, U.S. Pat. No. 4,459,168 issued Jul. 10, 1984 to Anselm discloses a wire reinforced hose and the method of forming the same.

While these devices fulfill their respective, particular objectives and requirements, the aforementioned patents do not describe a material feed hose system that allows for allowing a user to move material from one location to another location while keeping the material heated and isolated.

In this respect, the a material feed hose system according to the present invention substantially departs from the conventional concepts and designs of the prior art, and in doing so provides an apparatus primarily developed for the purpose of for allowing a user to move material from one location to another location while keeping the material heated and isolated.

Therefore, it can be appreciated that there exists a continuing need for a new and improved a material feed hose system which can be used for allowing a user to move material from one location to another location while keeping the material heated and isolated. In this regard, the present invention substantially fulfills this need.

SUMMARY OF THE INVENTION

In view of the foregoing disadvantages inherent in the known types of other method and apparatuses for transporting material now.present in the prior art, the present invention provides an improved a material feed hose system. As such, the general purpose of the present invention, which will be described subsequently in greater detail, is to provide a new and improved a material feed hose system and method which has all the advantages of the prior art and none of the disadvantages.

To attain this, the present invention essentially comprises a material feed hose system for allowing a user to move material from one location to another location while keeping the material heated and isolated. The system comprises several components in combination. First provided is a multilayered hose. The hose has an inflow end and an outflow end and an intermediate length there between. The hose has a central pathway there through to allow the passage of material through the hose. The hose has an inner layer forming a smooth inner surface of the hose pathway. The hose also has an intermediate insulating layer. The hose has an armored crush-resistant outer layer. There is a heating layer disposed between the inner layer and the intermediate layer of the hose.

Next provided is a power source coupled to the heating layer by a wire. Next provided is a pair of hollow tubular fittings. There is a fitting coupled to each end of the multilayered hose. Each of the fittings is fabricated of a rigid material and has a generally hollow tubular configuration. Each fitting has an inner end and an outer end. Each fitting has a smooth inner surface forming a hollow tubular material pathway. The inner surface has a radius beveled inlet to reduce the area of diminished flow within the hose. The fitting also has a stepped outer surface to provide a gripping surface thereto. Next provided is a pair of hose clamps. Each clamp comprises a pair of like-configured halves. Each half has an inner end and an outer end and an inner surface and an outer surface. The halves are mated along a longitudinal axis so that when coupled the halves form a tubular hollow recess within. The mated hose clamp halves, when mated, have an aperture on the inner end of the clamp and an aperture on the outer end of the clamp. Each half of the clamp has at least one pair of a threaded fastening means associated there with. One half of the clamp has at least one pair of screw holes there through and the other half of the clamp has at least one pair of female threaded screw-receiving bosses for coupling and holding the clamp halves together.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved material feed hose system which has all of the advantages of the prior art other method and apparatuses for transporting material and none of the disadvantages.

It is another object of the present invention to provide a new and improved material feed hose system which may be easily and efficiently manufactured and marketed.

It is further object of the present invention to provide a new and improved material feed hose system which is of durable and reliable constructions.

An even further object of the present invention is to provide a new and improved material feed hose system which is susceptible of a low cost of manufacture with regard to both materials and labor, and which accordingly is then susceptible of low prices of sale to the consuming public, thereby making such a material feed hose system economically available to the buying public.

Even still another object of the present invention is to provide a material feed hose system for allowing a user to move material from one location to another location while keeping the material heated and isolated.

Lastly, it is an object of the present invention to provide a new and improved material feed hose system that comprises several components in combination. Provided is a multilayered hose having an inflow end and an outflow end and an intermediate length there between. The hose has an intermediate insulating layer and an armored crush-resistant outer layer with a heating layer disposed between the inner layer and the intermediate layer. Also provided is a pair of hollow tubular fittings having a beveled inflow to limit the amount of material which is out of the flow path as the material moves through the hose. The fittings have an associated pair of hose clamps.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference-numerals refer to the same parts throughout the various Figures.

DESCRIPTION OF THE PREFERRED EMBODIMENT

Figure 1:
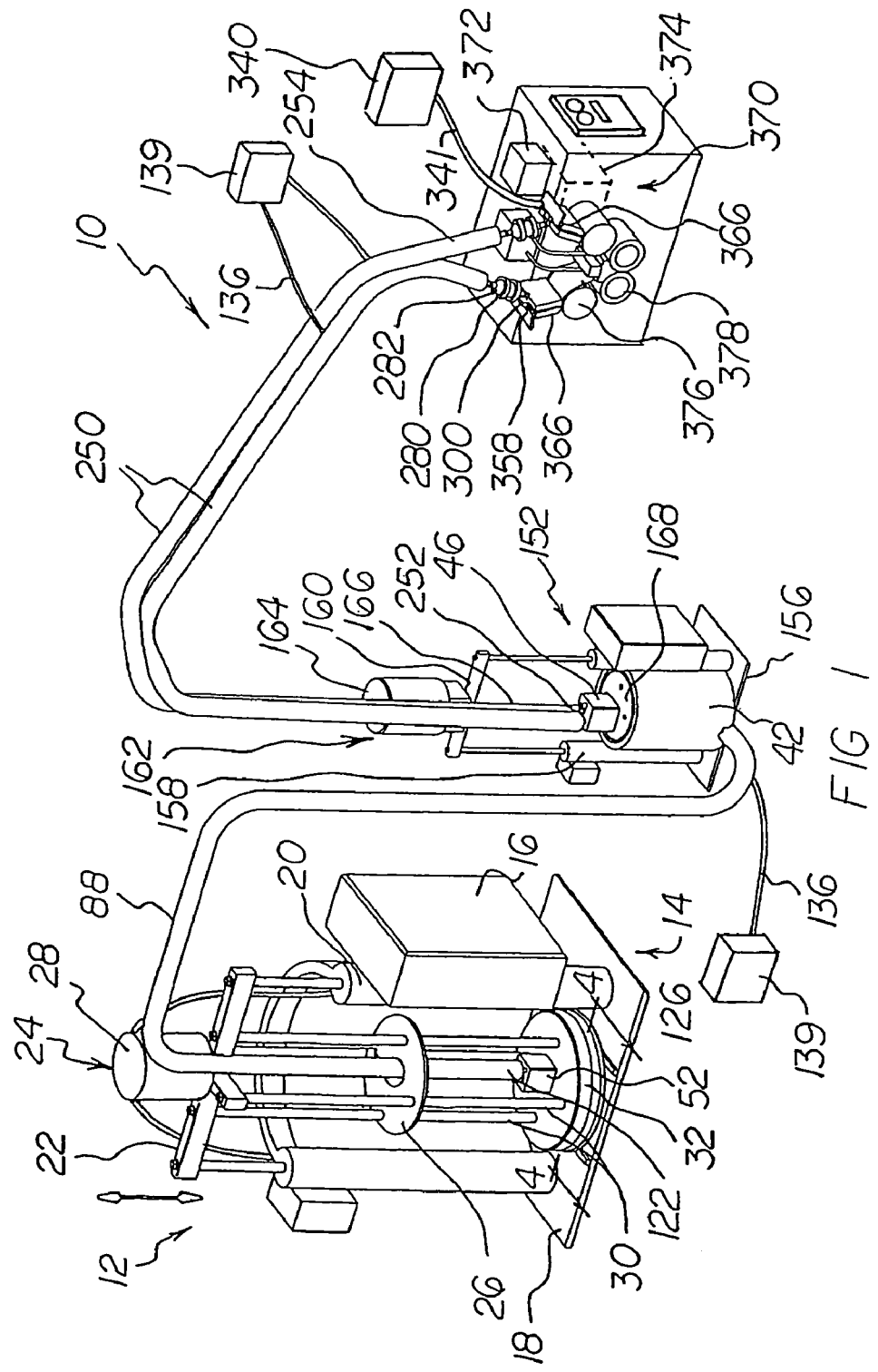
FIG. 1 is a perspective view of a typical application using the hose system.
Figure 2:
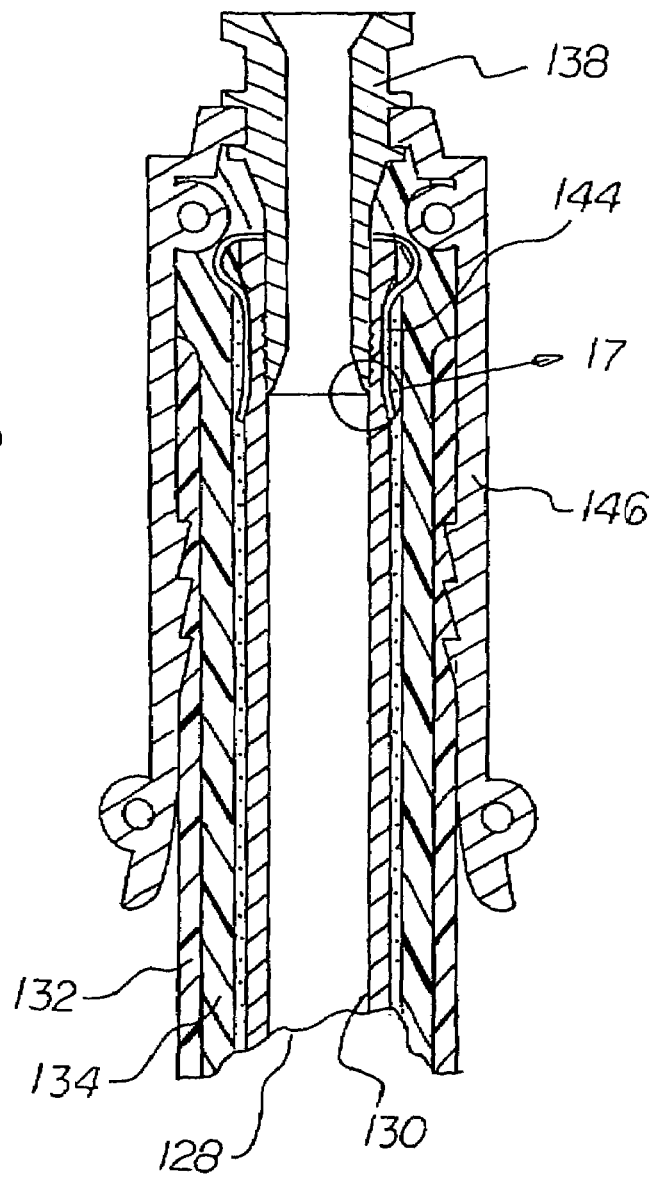
FIG. 2 is a cross-sectional view of one of the ends of the heated material feed hose.
Figure 3:
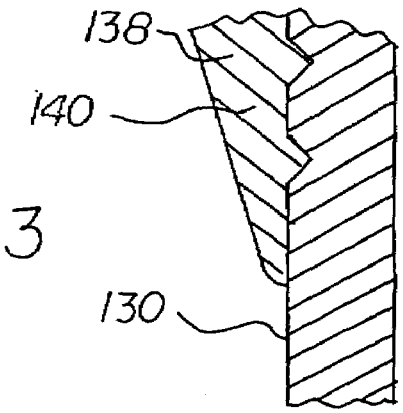
FIG. 3 is a close-up view of circle 140 of FIG. 2, showing the interface between the hose and the hose clamp.
Figure 4:
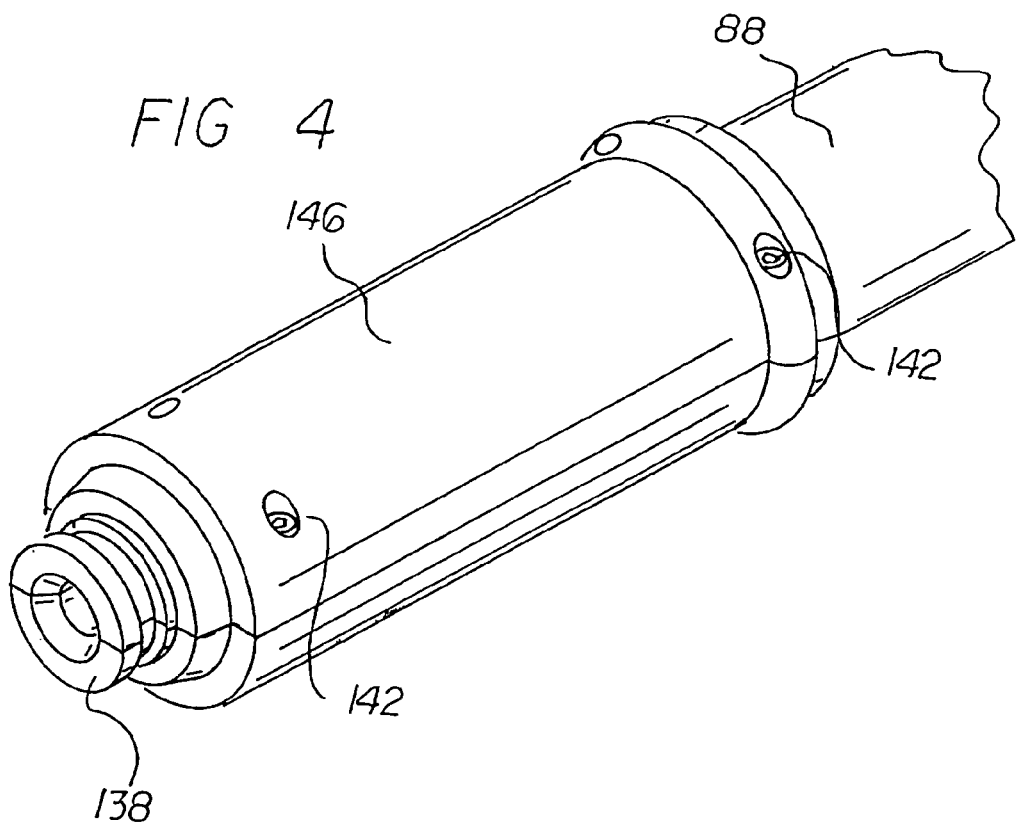
FIG. 4 is a perspective view of the end of the hose.
Figures 5, 6:
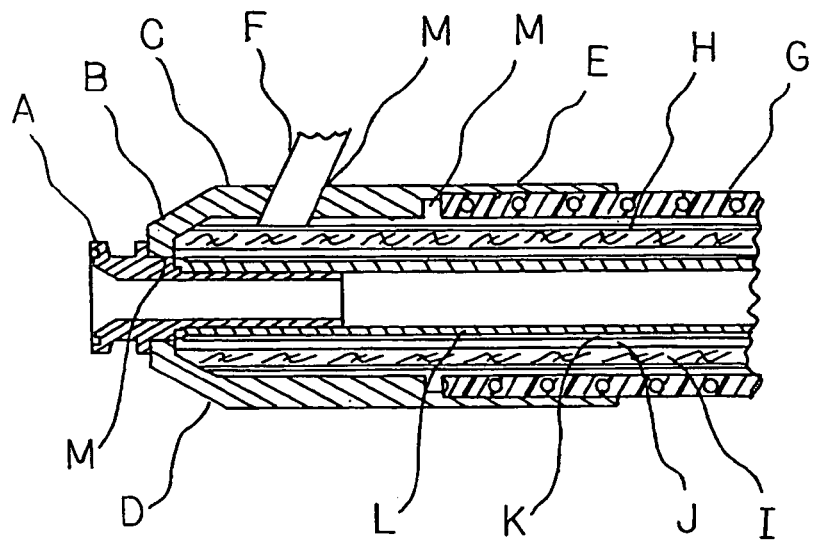
FIG. 5 is a side cross section of the hose and fitting in an operational configuration.
FIG. 6 is a part description of the components of the hose and fitting assembly.

With reference now to the drawings, and in particular to FIG. 1 thereof, the preferred embodiment of the new and improved a material feed hose system embodying the principles and concepts of the present invention and generally designated by the reference numeral 111 will be described.

The present invention, the material feed hose system 111 is comprised of a plurality of components. Such components in their broadest context include a hose, a pair of fittings, and a pair of hose clamps. Such components are individually configured and correlated with respect to each other so as to attain the desired objective.

The material feed hose system allows a user to move material from one location to another location while keeping the material heated and isolated.

First provided is a multilayered hose 250. The hose has an inflow end and an outflow end and an intermediate length there between. The hose has a central pathway there through to allow the passage of material through the hose. The hose has an inner layer 130 forming a smooth inner surface of the hose pathway. The hose also has an intermediate insulating layer 134. The hose has an armored crush-resistant outer layer 132. There is a heating layer 113 disposed between the inner layer and the intermediate layer of the hose.

Next provided is a power source 139 coupled to the heating layer by a wire 136.

Next provided is a pair of hollow tubular fittings 138. There is a fitting coupled to each end of the multilayered hose. Each of the fittings is fabricated of a rigid material and has a generally hollow tubular configuration. Each fitting has an inner end 141 and an outer end 139. Each fitting has a smooth inner surface forming a hollow tubular material pathway. The inner surface has a radius beveled inlet 137 to reduce the area of diminished flow within the hose. The fitting also has a stepped outer surface 140 to provide a gripping surface thereto.

Next provided is a pair of hose clamps 146. Each clamp comprises a pair of like-configured halves. Each half has an inner end and an outer end and an inner surface and an outer surface. The halves are mated along a longitudinal axis so that when coupled the halves form a tubular hollow recess within. The mated hose clamp halves, when mated, have an aperture on the inner end of the clamp and an aperture 147 on the outer end of the clamp. Each half of the clamp has at least one pair of a threaded fastening means 142 associated there with. One half of the clamp has at least one pair of screw holes there through and the other half of the clamp has at least one pair of female threaded screw-receiving bosses for coupling and holding the clamp halves together.

The invention may also be considered to comprise a method of constructing a material feed hose system for allowing a user to move material from one location to another location while keeping the material heated and isolated. The method includes the following steps:

The first step is providing a multilayered hose having an inflow end and an outflow end and an intermediate length there between, the hose having a central pathway there through to allow the passage of material through the hose, the hose having an inner layer forming a smooth inner surface of the hose pathway and an intermediate insulating layer and an armored crush-resistant outer layer with a heating layer disposed between the inner layer and the intermediate layer.

The next step is providing a power source coupled to the heating layer of the hose by a wire, the power source providing energy by which the heating element may heat and maintain the temperature of the contents of the hose.

The next step is providing a pair of hollow tubular fittings, with a fitting coupled to each end of the multilayered hose, each of the fittings fabricated of a rigid material and having a generally hollow tubular configuration with an inner end and an outer end, each fitting having a smooth inner surface forming a hollow tubular material pathway, the inner surface having a radius beveled inlet to reduce the area of diminished flow within the hose and a stepped outer surface to provide a gripping surface thereto whereby the hose fittings allow for the minimum of dead space within the hose thereby decreasing the risk of stale material in the hose.

The next step is providing a pair of hose clamps each hose clamp comprising a pair of like-configured halves with each half having an inner end and an outer end and an inner surface and an outer surface.

The final step is mating the halves of each hose clamp along a longitudinal axis so that when coupled the halves form a tubular hollow recess within, with an aperture on the inner end of the clamp and an aperture on the outer end of the clamp, each half of the clamp having at least one pair of a threaded fastening means associated there with, with one half of the clamp having at least one pair of screw holes there through and the other half of the clamp having at least one pair of female threaded screw-receiving bosses for coupling and holding the clamp halves together.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A material feed hose system for allowing a user to move material from one location to another location while keeping the material heated and isolated, comprising in combination:

a multilayered hose having an inflow end and an outflow end and an intermediate length there between, the hose having a central pathway there through to allow the passage of material through the hose, the hose having an inner layer forming a smooth inner surface of the hose pathway and an intermediate insulating layer and an armored crush-resistant outer layer with a heating layer disposed between the inner layer and the intermediate layer;

a power source coupled to the heating layer by a wire;

a pair of hollow tubular fittings, with a fitting coupled to each end of the multilayered hose, each of the fittings fabricated of a rigid material and having a generally hollow tubular configuration with an inner end and an outer end, each fitting having a smooth inner surface forming a hollow tubular material pathway centrally with a cone shaped interior surface at each end, the cone shaped surfaces being of an essentially common axial length, the inner surface having an internal radius beveled inlet to reduce the area of diminished flow within the hose and a stepped outer surface to provide a gripping surface thereto;

a pair of hose clamps each clamp comprising a pair of like-configured halves with each half having an inner end and an outer end and an inner surface and an outer surface, the halves being mated along a longitudinal axis so that when coupled the halves form a tubular hollow recess within, with an aperture on the inner end of the clamp and an aperture on the outer end of the clamp, each half of the clamp having at least one pair of a threaded fastening means associated there with, with one half of the clamp having at least one pair of screw holes there through and the other half of the clamp having at least one pair of female threaded screw-receiving bosses for coupling and holding the clamp halves together.

* * * * *